Feb. 8, 1927.
C. T. DENKER
1,616,611
APPARATUS FOR HEATING STREET PAVEMENTS
Filed Dec. 28, 1923
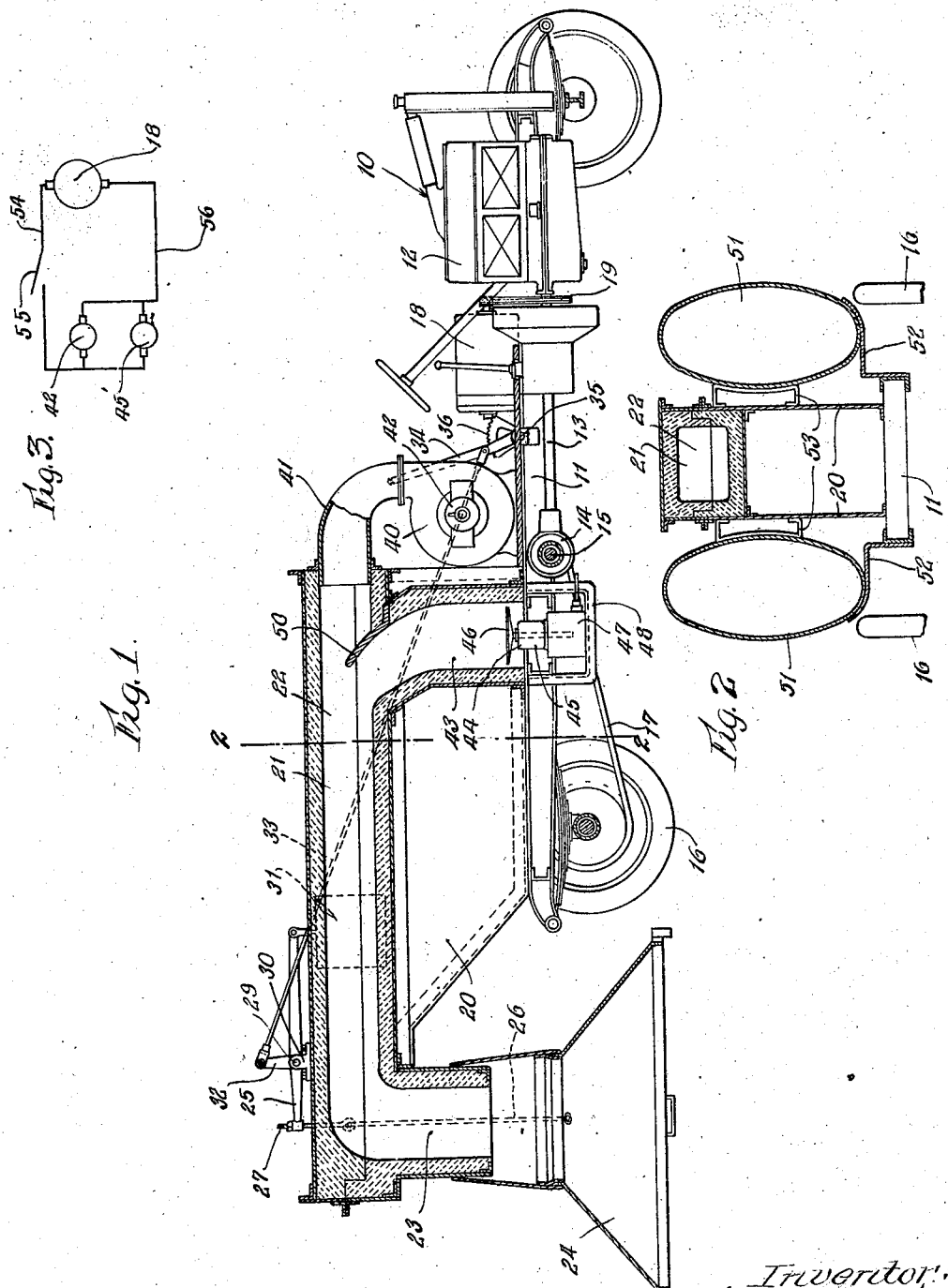
Inventor:
Charles T. Denker
By: Wm. O. Belt
Atty Patented Feb. 8, 1927.

1,616,611

UNITED STATES PATENT OFFICE.

CHARLES T. DENKER, OF CHICAGO, ILLINOIS, ASSIGNOR OF ONE-FIFTH TO OLIVER M. MacLAREN, OF CHICAGO, ILLINOIS.

APPARATUS FOR HEATING STREET PAVEMENTS.

Application filed December 28, 1923. Serial No. 683,150.

This invention relates to an apparatus for heating a street pavement which is to be repaired and the invention is preferably embodied in an apparatus which includes a self-propelled vehicle having its power unit operatively connected to suitable means for supplying a fluid under pressure to a hood adapted to distribute the fluid over a pre-determined area of the pavement and having its power unit operatively connected to separate means for supplying a heated fluid to the hood, the heated fluid forming a mixture with a fluid under pressure which mixture heats the pavement.

The object of the invention is broadly to provide an improved apparatus for heating street pavements.

A further object of the invention is to provide improved means for producing a mixture of a fluid under pressure with a heated fluid in an apparatus for heating street pavements.

Further objects of my invention will become apparent as the detail description progresses, reference being had to the accompanying drawings, wherein—

Fig. 1 is a central longitudinal section through an apparatus for heating street pavements, the apparatus embodying my invention.

Fig. 2 is a section on the line 2—2 of Fig. 1.

Fig. 3 is a diagram of a circuit which I employ in the preferred embodiment of my invention.

Referring now to the drawing, the reference character 10 designates a truck having a chassis 11, an engine 12, and a propeller shaft 13 which is operatively connected by a differential 14 to a plurality of shafts 15 adapted to drive the rear wheels 16 by means of sprocket chains 17, together with suitable sprockets. The engine 12 is operatively connected to a generator 18 by a chain drive 19.

The chassis 11 supports, by means of a plurality of vertically disposed side plates 20, a conduit 21 which preferably comprises a substantially horizontal passage 22 terminating at one end in a vertically disposed passage 23. The vertically disposed passage 23 forms the discharge outlet of the conduit 21 and communicates with a hood 24 suspended from a plurality of levers 25, a plurality of links 26 and threaded rods 27 being provided to secure the hood to the levers. The levers 25 are rigidly secured intermediate their ends to a shaft 29 disposed above the conduit 21 and rotatably journaled in a plurality of bearing blocks 30. The hood 24 is counter-balanced by a plurality of weights 31 pivotally secured to the forward ends of the levers 25. Means is provided for securing the hood 24 in a plurality of adjusted positions with respect to the surface of a pavement upon which the truck 10 is stationed. This means comprises a lever 32 rigidly secured to the shaft 29 and suitably connected by a rod 33 to a lever 34 which is pivotally mounted upon the chassis 11 as indicated at 35. The lever 34 carries manually operable means well known to those skilled in the art for engaging the teeth of a toothed segment 36. It is apparent that the lever 34 may be secured in a plurality of adjusted positions with respect to the toothed segment 36 and that the lever will in turn hold the hood 24 in a plurality of adjusted positions with respect to the pavement.

The conduit 21 is preferably constructed of sheet metal with a lining of fire brick. The forward end of the conduit is adapted to receive a supply of fluid under pressure, the means for supplying the fluid under pressure preferably comprising a centrifugal blower 40 having a discharge outlet connected to the forward end of the conduit 21 by means of a pipe section 41. The fan (not shown) of the blower 40 is driven by a motor 42 and it is apparent that when it is rotated by the motor it will supply air under pressure to the conduit 21 which will discharge the air into the hood 24.

A conduit 43 preferably disposed underneath the conduit 21 connects with the conduit 21 intermediate the ends thereof. The lower end of the conduit 43 is open to the atmosphere and is provided with means for heating any air which may flow or be drawn into the conduit. This heating means preferably comprises an oil burner 44 comprising a motor 45 adapted to rotate a disk 46 which atomizes oil drawn from a reservoir 47. The oil burner 44 is supported, in this instance, in a U-shaped bracket 48 depending from the chassis 11. It is readily understood that the oil burner when in operation will cause a current of air and products of combustion to flow upwardly through the conduit 43 and that this mixture will be heated to a relatively high temperature.

The upper end of the conduit 43 is inclined rearwardly as it meets the conduit 21, a baffle 50 being arranged transversely of the conduit 21 immediately in front of the junction of the conduit 43 with the conduit 21. The baffle 50 preferably forms a continuation of the wall of the conduit 43 and is so arranged that as the air under pressure from the blower 40 passes the baffle it will create a partial vacuum or induce a draft in the conduit 43, thus aiding the burner 44 in its task of supplying a heated fluid to the conduit 21 by way of the conduit 43.

The fuel for the oil burner 44 is carried in a plurality of tanks 51, one of the tanks being disposed on one side of the conduit 21 and the other tank being disposed on the other side of the conduit. The tanks 51 are supported and held in place by a plurality of brackets 52 mounted upon the chassis 11 and by a plurality of brackets 53 secured to the side plates 20.

The generator 18 is operatively connected to the motors 42 and 45 by a suitable circuit which is diagrammatically illustrated in Fig. 3. A conductor 54 connected to one terminal of the generator 18 provides means whereby the generated current may flow to the motors 42 and 45, a suitable switch 55 being provided in the conductor to control the circuit. The current returns to the generator by way of a conductor 56 connected to the other terminal of the generator.

In the operation of the apparatus, the truck is so positioned that the hood 24 may be lowered upon a section of pavement which is to be repaired, the position of the hood being controlled by the lever 34 by means and in the manner hereinbefore described. The switch 55 is then closed, the burner lighted, and the apparatus left in this condition until the selected area of pavement has been sufficiently heated. The truck may then be brought to a new position.

My invention lends a high degree of efficiency to an apparatus for heating street pavements. The blower 40 insures a sufficient quantity of the fluid under pressure and the velocity of the fluid under pressure enables it to create a partial vacuum in the conduit 43, thus assisting the oil burner 44 to create a current of heated fluid which will mix with the fluid under pressure and pass to the hood. Perfect combustion is insured as any as any combustible gases flowing from the conduit 43 into the conduit 21 will combine with the oxygen of the air supplied by the blower 40; the high temperature obtaining in the conduit 21 insures the reaction. Thus, a maximum amount of heat energy is released and the fluid mixture delivered to the hood is kept at a suitable temperature by using a minimum amount of fuel.

I am aware that changes in the form, construction and arrangement of parts may be made without departing from the spirit and without sacrificing the advantages of the invention and I reserve the right to make all such changes as fairly fall within the scope of the following claims.

I claim:

1. An apparatus for heating street pavements, comprising a vehicle, a substantially horizontal conduit carried by the vehicle and having its outer end terminating in a downturned elbow, an open bottomed hood carried by the elbow, an upright conduit having an open lower end and communicating at its upper end with the horizontal conduit through the bottom thereof, the front wall of the upright conduit having an extension projecting rearwardly into the horizontal conduit and overhanging the top of the upright conduit, an oil burner mounted in the open lower end portion of the upright conduit, and a blower communicating with the forward end of the horizontal conduit.

2. An apparatus for heating street pavements, comprising a vehicle, a substantially horizontal conduit carried by the vehicle with its outer end extending beyond the vehicle and terminating in a downturned elbow, an open bottom hood carried by the elbow, an upright conduit open at its bottom end and communicating at its upper end with the horizontal conduit through the bottom thereof, the front wall of the upright conduit having an extension projecting rearwardly into the horizontal conduit and overhanging the top of the upright conduit, an oil burner mounted at the bottom of the upright conduit and including a rotatable atomizing element within the conduit, a fuel tank carried by the vehicle and communicating with the oil burner, and a blower carried by the vehicle and communicating with the forward end of the horizontal conduit.

CHARLES T. DENKER.